April 21, 1936.  R. J. PARSONS  2,038,193
HEATING SYSTEM FOR AUTOMOTIVE VEHICLES
Filed Aug. 2, 1932
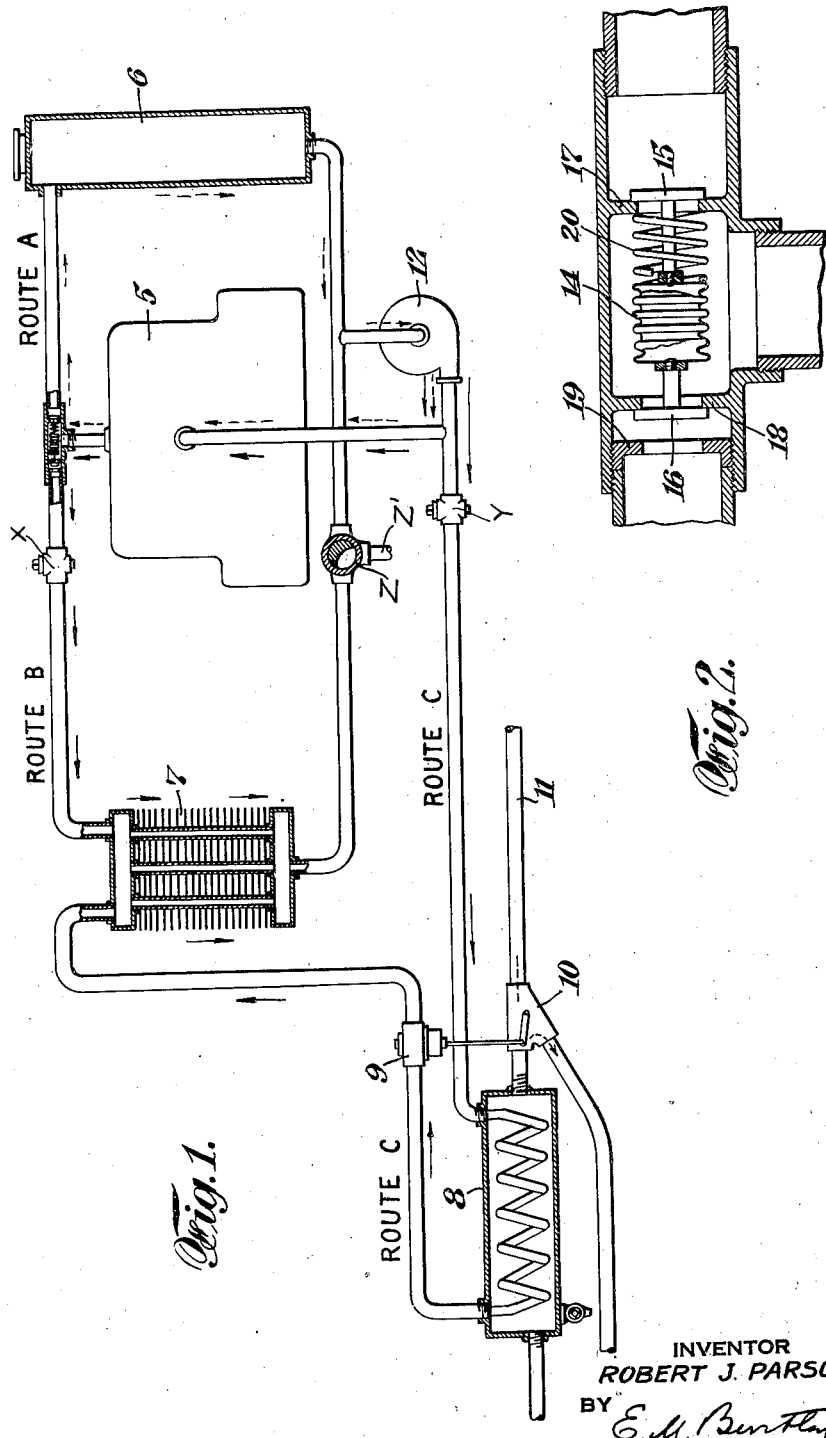
INVENTOR
ROBERT J. PARSONS
BY
E. M. Bentley
ATTORNEY Patented Apr. 21, 1936

2,038,193

UNITED STATES PATENT OFFICE 2,038,193

HEATING SYSTEM FOR AUTOMOTIVE VEHICLES

Robert J. Parsons, Schenectady, N. Y., assignor to Consolidated Car-Heating Company, Inc., Albany, N. Y., a corporation of New York Application August 2, 1932, Serial No. 627,297

5 Claims. (Cl. 237—12.3)

For a detailed description of the present form of my invention, reference may be had to the following specification and to the accompanying drawing forming a part thereof, wherein Fig. 1 is a diagrammatic outline of the system and Fig. 2 is a detailed view of the thermostatic controller.

My invention is an automatic vehicle heater designed particularly for buses and other self-propelled cars. My heater is of a duplex character, the heat therefor being derived from two sources, viz: (a) a heater or boiler in the engine exhaust line and (b) the cooling water of the engine radiator. By this means I am enabled to make my heater serve as an automatic regulator for the engine temperature, protecting it, on the one hand, against excessive or injurious heating and, on the other hand, maintaining its temperature above a desired minimum, in order to avoid loss of engine efficiency. Moreover, there are days in winter when adequate heat for the car cannot be secured from the radiator circulation alone without so over-cooling the engine as to impair its operation and durability. On such days I can, if I desire, use supplementary car heat from the engine exhaust, which is the first source of heat aforesaid. Thereby the car heater is arranged to automatically keep the engine temperature between the prescribed upper and lower limits without need of constant manipulation by the driver, and in so doing only drawing on the supplementary source of heat at such times and to such a degree as may be necessary to maintain the engine between the said upper and lower limits and, at the same time, to maintain the car at a proper temperature.

Referring to the drawing, 5 indicates the engine and 6 its radiator. A car-heating radiator is indicated at 7 and at 8 is a boiler heated by the engine exhaust in pipe 11. The radiator 6 and boiler 8 are the two aforesaid sources of heat on which I rely, the circulation being maintained by a pump 12. The automatic regulator is shown in detail in Fig. 2 and consists of a thermostat 14 in the form of a sealed corrugated tube containing a liquid responsive to temperature changes, together with operated valves 15 and 16, one at the right and the other at the left of tube 14. A spring 20 at the right of the tube 14 tends to hold the valve in the position shown in Fig. 2, in which position valve member 15 is closed against its single seat 17 and valve member 16 against its right-hand seat 18 leaving its left-hand seat 19 open. This is the condition of the valve when the engine is cold. There is one such thermostatic valve located just above engine 5 between the two pipes marked respectively "Route A" and "Route B". There is also a second thermostatic controller marked 9 located in the pipe "Route C" about midway therein between the car-heater 7 and the water-heater 8. But this second thermostatic controller 9 merely serves to open or close, as shown, the by-pass valve 10 in the engine exhaust pipe 11, the same valve being also actuated manually, when so desired, regardless of the thermostatic controller 9. Valves X and Y are conventionally-illustrated shut-off valves of any preferred construction, for closing circulation routes B and C whenever desired. The valve Z is a drainage valve by means of which the system may be drained when desired through the drain pipe Z'. This valve is normally in a closed position establishing communication between the pump 12 and the radiator 7, but is shown as in open position for drainage of route B while the system is not in use. The function of this by-pass valve 10 is to short-circuit the engine exhaust from the water-heater 8 to the atmosphere, thus stopping the heat in the boiler 8 which is the second of the two sources of heat above mentioned. In practice the engine jacket, radiators 6 and 7, boiler 8, and the various pipes are normally filled with water.

The connections being as thus described, with the valves X and Y open, and the valve Z adjusted to connect the radiator 7 and pump 12 and to shut off escape through the drainage pipe Z', the operation is as follows: When the engine is cold, the thermostatic controller 14 is as shown in Fig. 2, that is, valves 15 and 16 are both closed to prevent circulation of water through routes A and B, but the water is free to circulate from pump 12 through the pipe marked "Route C" to the heater 8 and then through the car radiator 7 back to the pump 12. As the engine water warms up the bellows of thermostatic tube 14 will expand and open, first the left-hand valve 16. That will allow the engine water to flow, by the pipe marked "Route B" directly to the car radiator 7 while it still continues to flow thereto by "Route C" as above described. But this direct flow to the radiator 7 through "Route B" only continues until its predetermined temperature causes the aforesaid valve 16 to close against its second seat 19. Then a little further expansion of 14 will open the right-hand valve 15 and allow the engine water to flow through the pipe marked "Route A" into the engine radiator 6, as well as through "Route C" into the car radiator 7. This flow through "Route A" to the engine radiator 6 will only continue so long as valve 15 is held open by the thermostatic regulator and will stop when said valve 15 is closed as the temperature falls. Thereby the temperature of the engine jacket water can not go above the danger point being controlled by the opening or closing of valve 15.

Should the water in "Route C" from the exhaust boiler 8 reach a predetermined temperature, the thermostatic controller 9 in said "Route C" will act to by-pass the exhaust gas around the boiler 8 by the by-pass valve 10. As aforesaid this by-pass valve 10 may be operated either manually or thermostatically. When the by-pass valve 10 is open and short-circuiting the exhaust gas around boiler 8, water will still circulate through "Route C" as aforesaid, but it will not be very hot because it will be taken from the lower side of the engine radiator 6 and from the lower side of the car-heater 7, and it may be shut off, if desired, by the operator closing a shut-off valve Y in "Route C", which valve will be conveniently located. In summer the heating radiator can be shut off entirely and the system drained.

What I claim as new and desire to secure by Letters Patent is:

1. In a heating system of the character described, the combination with the cooling jacket of an internal combustion engine having an inlet pipe and an outlet pipe, branch pipes leading from the outlet pipe in opposite directions, one of said branch pipes having spaced apart valve seats therein, a heating radiator connected with the last mentioned branch pipe, a cooling radiator connected with the other branch pipe, there being a single valve seat in the said other branch pipe, a valve movable between the said spaced apart valve seats, a valve cooperating with the valve seat in the other branch pipe, a thermostat interposed between said valves in such manner that the second valve is held to its seat and the first valve is held to one of its seats, means for holding said second valve in seated position until the other valve has moved to its other seat as the thermostat expands, and means connecting said radiators with said inlet pipe.

2. In a heating system of the character described, the combination with the cooling jacket of an internal combustion engine having an inlet and an outlet, a cooling radiator, a heating radiator, means connecting said radiators with said inlet, a branch pipe leading from the outlet to the cooling radiator and having a valve seat therein, a second branch pipe leading from said outlet to the heating radiator and having spaced apart valve seats, valves in the respective branch pipes controlling said valve seats, one of said valves controlling both of the valve seats in the heating radiator branch pipe, a thermostat interposed between and connected to said valves, and a spring bearing against said thermostat, said spring and said thermostat being so constructed and arranged that while the thermostat is cold the valves will be seated against the nearest adjacent valve seats of the branch pipes, and that as the temperature rises the valve in the heating radiator branch pipe will be moved to its second seat before the other valve is unseated.

3. In a heating system of the character described, the combination with the cooling jacket of an internal combustion engine, said jacket having an inlet pipe and an outlet pipe, branch pipes leading from the outlet pipe in opposite directions, a cooling radiator connnected with one branch pipe, a heating radiator connected with the other branch pipe, there being two adjacently located valve seats between the outlet pipe and the last-mentioned branch pipe, a valve seat in the branch pipe leading to the cooling radiator, means connecting the radiators with said inlet pipe, a thermostatic member disposed across the discharge end of the outlet pipe and and in axial alinement with said branch pipes, valves controlling flow of liquid from said outlet pipe to the heating and cooling radiators respectively, the valve controlling the flow to the heating radiator being located between said two adjacently located valve seats and engageable with either of them, said valves being connected with said thermostat in such manner that both valves are normally seated while the thermostat is cold, means for holding the cooling-radiator-controlled valve to its seat until the other valve has moved from one of its seats to its other seat as the thermostat expands, a supplemental water heating means, a conduit leading from said supplemental water heating means to the heating radiator, a conduit connecting the impeller with said supplemental water heating means, and means connecting the inlet of said water jacket with the last-mentioned conduit at a position between the impeller and the supplemental water heating means.

4. In a heating system of the character described, the combination with the cooling jacket of an internal combustion engine, said jacket having an inlet pipe and an outlet pipe, branch pipes leading from the outlet pipe in opposite directions, a cooling radiator connected with one branch pipe, a heating radiator connected with the other branch pipe, there being two adjacently located valve seats between the outlet pipe and the last-mentioned branch pipe, a valve seat in the branch pipe leading to the cooling radiator, means connecting the radiators with said inlet pipe, a thermostatic member disposed across the discharge end of the outlet pipe and in axial alinement with said branch pipes, valves controlling flow of liquid from said outlet pipe to the heating and cooling radiators respectively, the valve controlling the flow to the heating radiator being located between said two adjacently located valve seats and engageable with either of them, said valves being connected with said thermostat in such manner that both valves are normally seated while the thermostat is cold, and means for holding the cooling-radiator-controlling valve to its seat until the other valve has moved from one of its valve seats to its other valve seat as the thermostat expands.

5. In a heating system of the character described, the combination with the cooling jacket of an internal combustion engine, said jacket having an inlet pipe and an outlet pipe, of a heating radiator, a cooling radiator, an impeller, means connecting said radiators with the outlet pipe of said water jacket, means connecting the impeller with the inlet pipe of said water jacket and also with said radiators, valves controlling flow from the cooling jacket to the respective radiators, there being two adjacently located valve seats between said outlet pipe and said heating radiator, one of said valves being located between said seats and engageable with either of them, a valve seat in the branch pipe leading to the cooling radiator, thermostatic means for normally seating said valves while fluid flowing from said cooling jacket is cold, said valves being connected with the thermostat in such manner that both valves are normally seated while the thermostat is cold, means for holding the cooling-radiator-controlling valve to its seat until the other valve has moved from one of its seats to its other seat as the thermostat expands, a supplemental water heating means, means connecting said supplemental water heating means with the heating radiator, and means connecting said impeller with said supplemental heating means.

ROBERT J. PARSONS.